United States Patent [19]

Hancock

[11] Patent Number: 5,179,377
[45] Date of Patent: Jan. 12, 1993

[54] TCAS VIEW DISPLAY FORMAT WITH HORIZONTAL TREND

[75] Inventor: William R. Hancock, Phoenix, Ariz.

[73] Assignee: Honeywell Inc., Minneapolis, Minn.

[21] Appl. No.: 636,322

[22] Filed: Dec. 31, 1990

[51] Int. Cl.$^5$ ............................................. G08G 5/04
[52] U.S. Cl. .................................... 340/961; 342/29; 364/461
[58] Field of Search ................ 340/961; 364/461, 439; 342/29-32, 455, 458

[56] References Cited

U.S. PATENT DOCUMENTS

| | | |
|---|---|---|
| 2,994,867 | 8/1961 | Pierce . |
| 3,150,364 | 9/1964 | Green . |
| 3,300,778 | 1/1967 | Vickers . |
| 4,380,050 | 4/1983 | Tanner . |
| 4,403,220 | 9/1983 | Donovan . |
| 4,835,537 | 5/1989 | Manion .............................. 340/961 |
| 4,914,733 | 4/1990 | Gralnick ............................. 342/29 |

FOREIGN PATENT DOCUMENTS

| | | |
|---|---|---|
| 0405430 | 1/1991 | European Pat. Off. . |
| 0411309 | 2/1991 | European Pat. Off. . |
| 1076574 | 7/1967 | United Kingdom . |
| 2151425 | 7/1985 | United Kingdom . |

OTHER PUBLICATIONS

Eleccion: "The Promise of Air Safety", Jul. 1975 *IEEE Spectrum*.
Bemis et al.: "Operator Performance as a Function of Type of Display: Conventional versus Perspective", 1988 *Human Factors*, vol. 30(2), pp. 163-169.
Ellis et al.: "Perspective Traffic Display Format and Airline Pilot Traffic Avoidance", 1987 *Human Factors*, vol. 29(4), pp. 371-382.
Gilbert: "Future Developments in Instrumentation for All-Weather Air-Traffic Control", Apr. 1945 *Aviation Instruments*, vol. 4, No. 4.
Zeluff: "Electronic Aviation", Jun. 1944 *Scientific American*.
Klass: "United Airlines T/CAS Tests Demonstrate Increased Safety", Nov. 21, 1988 *Aviation Week & Space Technology*.

*Primary Examiner*—Jin F. Ng
*Assistant Examiner*—Brent A. Swarthout
*Attorney, Agent, or Firm*—John G. Shudy, Jr.

[57] ABSTRACT

A TCAS view image format with horizontal trend for a traffic situation awareness display in a craft, having the craft represented by a center symbol, having traffic represented by position symbols that indicate by shape the horizontal heading of a craft, having the shape of the represented vehicle and varying size to represent level of traffic threat or closeness in altitude differential, having symbols that indicate altitude and trend of altitude, and having symbols that in shape and color redundantly indicate the level of traffic threat.

4 Claims, 4 Drawing Sheets

TCAS VIEW DISPLAY FORMAT WITH HORIZONTAL TREND

This invention was developed under U.S. Government contract DTFA01-85-C-0005.

FIELD OF THE INVENTION

The present invention pertains to air traffic displays and particularly to display formats for an air traffic alert and collision avoidance system (TCAS). More particularly, the invention pertains to TCAS display formats having three-dimensional perspective color graphics.

BACKGROUND OF THE INVENTION

The function of the TCAS display is to present air traffic information, declare threats, and provide advisories on potential air traffic conflicts before the closest point of approach. The TCAS display of the related art uses two-dimensional graphics to convey traffic information in the own aircraft's protected volume of airspace. However, since two-dimensional graphics can only depict information on two (X- and Y-axes) of the three dimensions required to completely represent spacial traffic relationships for TCAS (X-, Y- and Z-axes), numerics are used to portray relative altitude on the Z-axis. This two-dimensional plan view display of TCAS traffic information (supplemented with numeric data tags for the third-dimension, altitude) does not provide a direct visual display of dynamic spacial relationships existing between air traffic in the natural three-dimensional space. Interpretation of such a display requires considerable time and mental effort, in that it requires pilots to mentally construct a three-dimensional image of the traffic situation by combining graphically displayed azimuth and range information with numerically-presented altitude information.

The related art TCAS display, therefore, is limited to function as an aid to direct visual acquisition of target aircraft, rather than as a correct, veridical, and easily interpretable complete "picture" of the current traffic situation. Pilots simply use the presented information as a cue for visual search to locate potential threats by direct visualization of aircraft outside the cockpit. Furthermore, since the traffic information is dynamic and continuously updated, direct visualization will require pilots to continuously alternate their attention from reading the numerics on the head-down TCAS display to the head-up search for aircraft outside the cockpit. Thus, using the related art TCAS display, pilots often find it time-consuming and confusing to visually acquire and process dynamic changes in the air traffic situation under moderate or high cockpit work load situations.

Attempts of the related art to solve the problems of indirect visualization of conventional displays have focused on basic symbology refinement for the two-dimensional TCAS display format. Efforts have been made to reduce confusion and misinterpretation by modifying the symbols. For example, all the numeric codes were intially displayed above the aircraft symbol with a "plus" or "minus" sign to indicate relative elevation. The most current baseline TCAS display presents the numerics either above or below the symbol for conceptual compatibility. No effort has been made to explore other innovative approaches or to empirically validate current design concepts. However, research on display formats for other applications reveals potential benefits of an innovative three-dimensional perspective format. Ground-based perspective traffic display formats have bee studied in the related art to demonstrate the advantages of utilizing respective graphics for portraying complex spacial situations. Conditionally, respective displays for naval battle field management systems have been previously studied to examine the feasibility and the advantages of three-dimensional graphic presentations. Such studies have shown significant advantages of three-dimensional formats over two-dimensional formats.

SUMMARY OF THE INVENTION

The present invention relates to formats for the display of data in an airborne environment to assist the pilot in being more cognizant of the conditions in his/her airspace, thereby enhancing his/her situational awareness. This format is specifically designed for the TCAS, in which aircraft information in a protected three-dimensional volume of air space surrounding an aircraft is presented with respect to that aircraft. The present invention implements three-dimensional perspective graphics in color to display easily and directly interpretable dynamic spacial relationships for the TCAS system. This format is equally applicable to military situation awareness formats where the pilot needs to quickly and accurately recognize what traffic and targets are in the surrounding airspace.

The invention uses three-dimensional perspective graphics rather than a two-dimensional format supplemented with numeric data tags. The advantages of the present invention are: the realistic and intuitive portrayal of traffic information in three-dimensional perspective that results in the correct perception of the three-dimensional air space; appropriate use of color, shape and size coding that is compatible with the pilot's expectations; and the integration of displayed situational information to facilitate rapid interpretation by the pilot. The primary objectives of this new display format are: to enhance the speed and accuracy of the pilot's understanding of the egocentric traffic situation; to minimize complex cognitive processing and pilot mental workload; and to allow the pilot to review and plan evasive maneuvers earlier and more effectively in order to avoid potential air traffic conflicts. Therefore, the function of the TCAS display is greatly extended and is no longer limited to providing cues for visual acquisition of traffic outside the aircraft.

DESCRIPTION OF PREFERRED EMBODIMENTS

Figure 1:
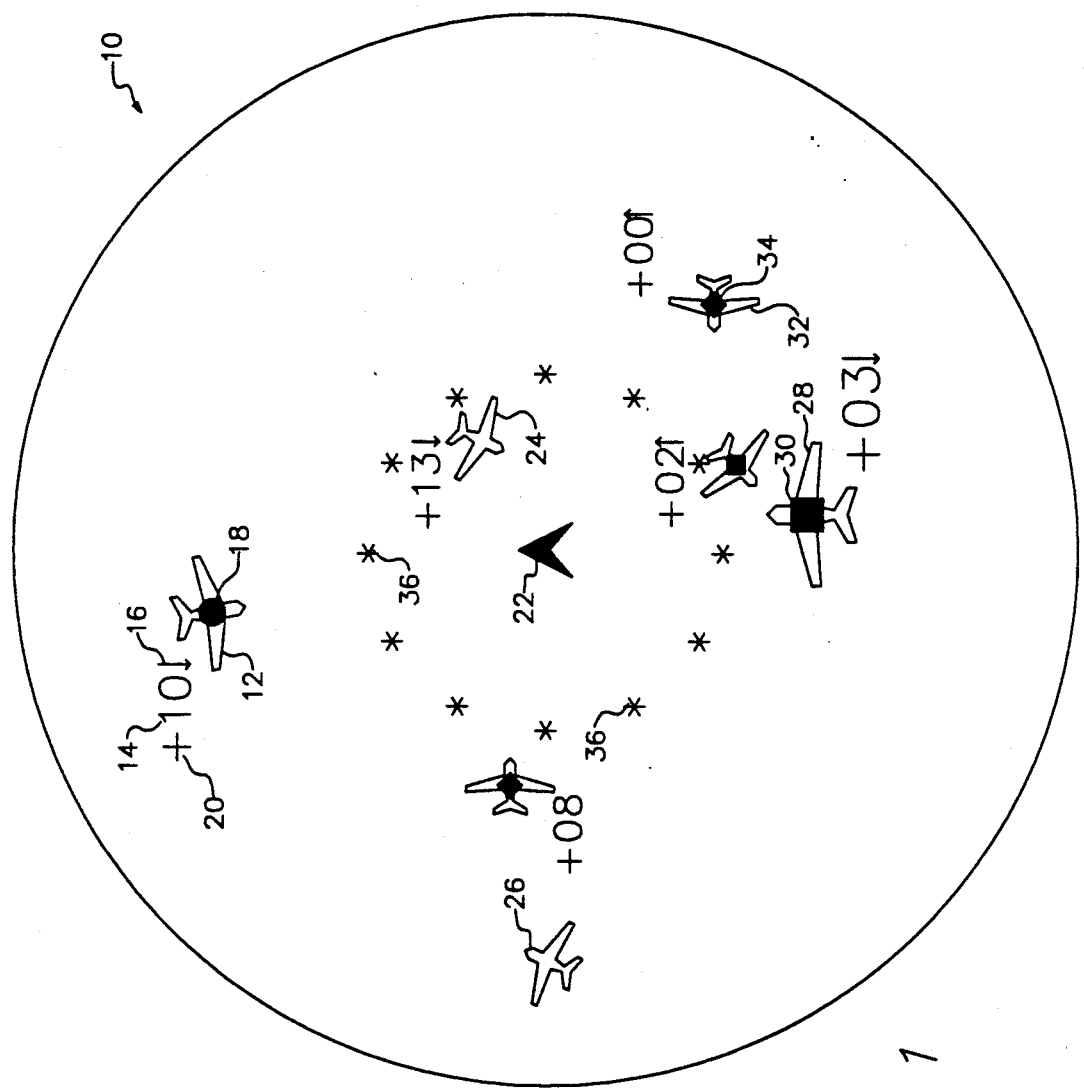
FIG. 1 reveals the TCAS format of the present invention, wherein the threat level is indicated by the size of the traffic alert symbol.

The present invention is a view presentation for a TCAS system which integrates color coding and symbols which rotate to provide horizontal trend and threat levels to the pilot. This view can be observed from various perspective viewpoints which can vary from direct overhead normal plan view (look-down view) to a direct forward view, or to a viewpoint about halfway between the two. The present display format enhances the pilot's understanding and monitoring of dynamic spacial relationships between his or her own aircraft and other aircraft within the proximal airspace and to improve his or her ability to detect and avoid potential traffic and collisions. The function of the TCAS display is to present traffic information, declare threats, and provide resolution advisories before the closest point of approach. FIG. 1 depicts the present invention which is a direct look-down view of the TCAS plan view presentation with horizontal trend data. The TCAS plan view of FIG. 1 utilizes an aircraft symbol 12, for instance, which resembles a passenger jet aircraft and indicates the aircraft directional trend. A numerical readout 14 indicates relative altitude and directional arrow 16 indicates the vertical trend of the aircraft resembled by symbol 12. On symbol 12 there is a traffic alert symbol 18 which is a yellow medium circle superimposed on symbol 12. Symbol 20 associated with altitude symbol 14 indicates that the aircraft represented by symbol 12 is at an altitude above the own aircraft which is represented by symbol 22 at the center of format 10. When symbol 20 is a "—", that means that the associated symbol 12 represents an aircraft which is at an altitude below own aircraft 22. Since aircraft symbol 12 may rotate the position of the altitude tags, 14, 16 and 20 are situated such that the tag centroid is directly behind the right wing tip of symbol 12. The centroid of the altitude tags 14, 16 and 20 thus rotates with aircraft symbol 12 although the numerics and associated symbols remain upright for easy reading. This approach allows the pilot to more easily correlate the aircraft observed and its corresponding symbol 12 with its associated altitude tags 14, 16 and 20. The particular format of FIG. 1 has aircraft symbols that enlarge as the threat level of the represented aircraft increases. Normal traffic is presented at a 0.75 size, the traffic having a traffic advisory is drawn at a 1.0 size, and the traffic having a resolution advisory is drawn at a 1.25 size, relative to a norm of a 1.0 dimension. Hence, the most prominent threat is clearly larger than the normal traffic. Threat status is also indicated by overlaying TCAS threat symbols on the traffic or airplane symbol 12. These items provide the pilot a triple redundant coding of threat, that is, color, size and overlaid threat symbol. A traffic symbol 24 having no threat symbol superimposed upon it, represents an aircraft that is above a certain altitude and is not a threat to own aircraft 22. Not having extra symbols, which would represent the absence of threat, superimposed on traffic symbols such as symbol 24, helps declutter display 10. Symbol 26, not having altitude tags, represents an aircraft whose altitude is unknown to the pilot of own aircraft 22. Typically, an aircraft represented by symbol 26 has no altitude transponders to provide own aircraft with altitude or vertical directional data. Symbol 28 is a symbol of 1.25 size indicating a resolution advisory of the aircraft that it represents. Superimposed on symbol 28 is symbol 30 which is a square which means a resolution advisory and has a color red which also indicates a resolution advisory of the aircraft represented by symbol 28. A normal proximate traffic symbol 24 represents an aircraft or traffic that is more than 1200 feet in altitude differential. Aircraft symbol 32 is at size 0.75 but has a normal proximate traffic symbol superimposed on it which represents that the aircraft is within 1200 feet of the present altitude of own aircraft 22. Symbol 34 is a diamond-shape representing normal proximate traffic at less than 1200 feet altitude differential and has a color of cyan also designating normal traffic of less than 1200 feet altitude differential from own aircraft 22. The twelve symbols 36 represent azimuth about own aircraft symbol 22 and constitute a two nautical mile range indicator from own aircraft 22.

Figure 2:
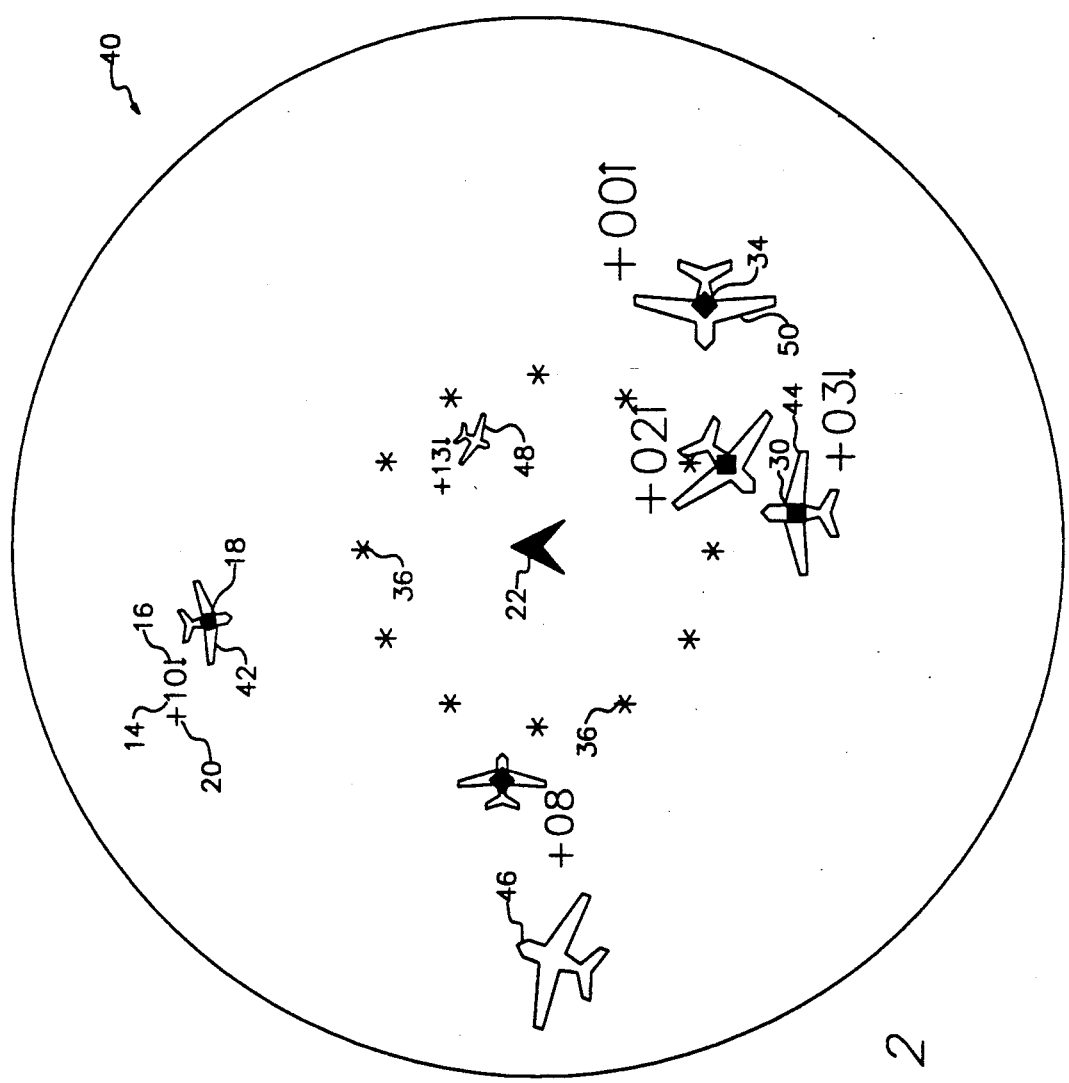
FIG. 2 reveals a TCAS format of the present invention, wherein the altitude differential is indicated by the size of the traffic alert symbol.

FIG. 2 depicts a format wherein the size of aircraft symbol 42, 44 or 50 has a size related to altitude differential from own aircraft represented by symbol 22 rather than having a size related to a threat level as in FIG. 1. The changing size of aircraft symbols 42, 44, 48 and 50 provide relative motion cues to the pilot as the planes move away from or approach own aircraft 22. Such enhancement is useful to the pilot of own aircraft where direct visual contact is limited due to bad weather, for instance, or instrument flying is necessary. Symbol 46 is a relatively large symbol that represents proximate traffic of unknown altitude. A relatively small symbol 48 represents normal proximate traffic more than 1200 feet of relative altitude from own aircraft 22. The size of symbol 44 represents the relative altitude of the aircraft from own aircraft 22; however, the advisory of this aircraft is indicated by symbol 30 superimposed on symbol 44 wherein symbol 30 is a square signifying a resolution advisory and further has the color red likewise signifying a resolution advisory. Symbol 50 is of a relatively large size on format 40 in that it represents an aircraft at a low altitude difference (e.g., zero feet) from own aircraft 22. Symbol 34 superimposed on symbol 50 indicates normal proximate traffic at less than 1200 feet. Symbol 34 is a diamond which represents normal proximate traffic and is of the color cyan that also represents normal proximate traffic at less than 1200 feet relative altitude from own aircraft 22. Aircraft symbol 42 represents an aircraft that is about 1000 feet in relative altitude from own aircraft 22 which altitude is represented not only by symbol 14 but also by the size of symbol 42. Superimposed on symbol 42 is symbol 18 which is a medium circle that indicates a traffic alert and has the color yellow that likewise indicates a traffic alert.

Figure 3:
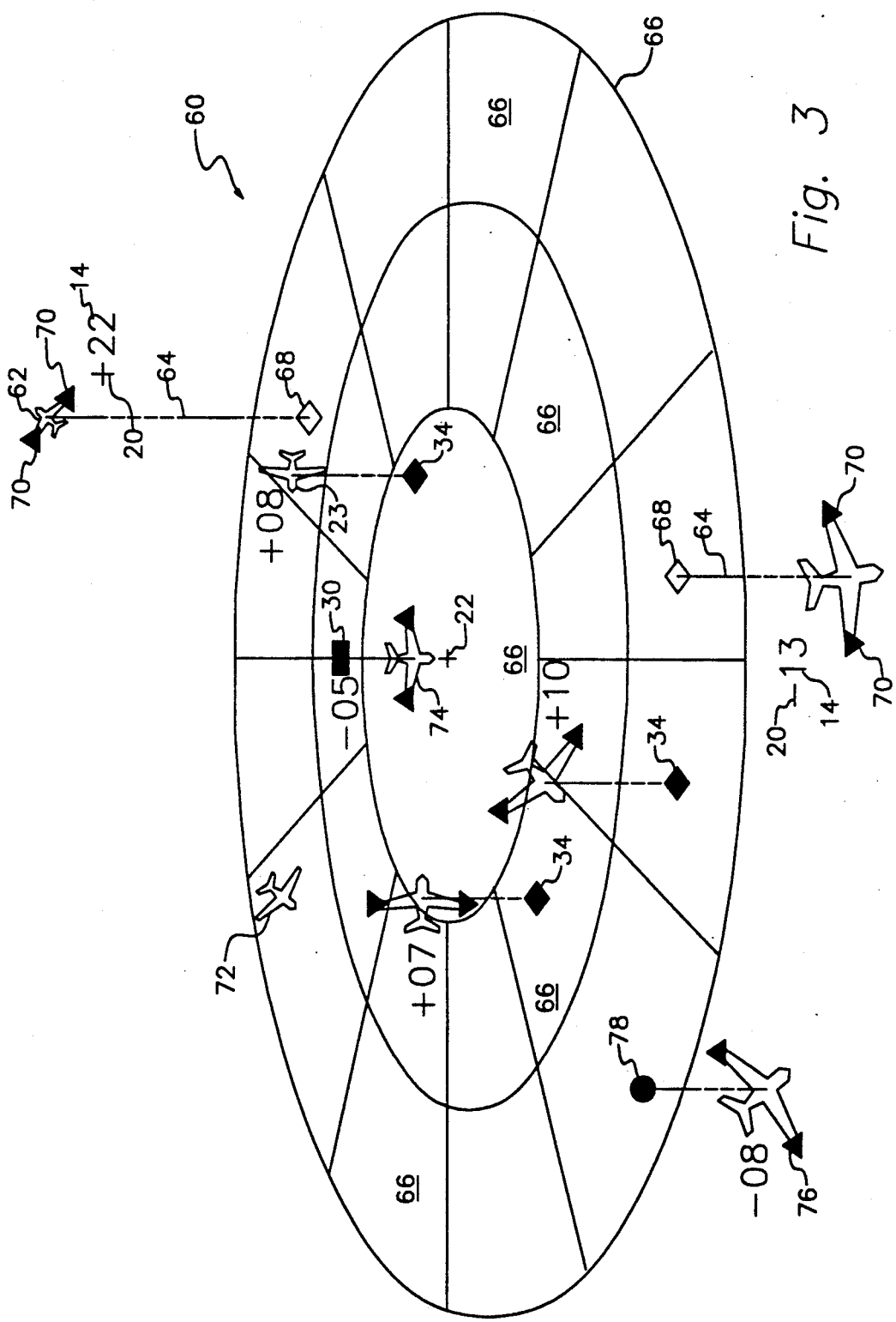
FIG. 3 is a 2.5 dimensional perspective format of the invention.

FIG. 3 is a 2.5-dimension perspective view of the TCAS plan format 60. Format 60 is similar to plan view format 10 except that the observer of format 60 is looking at the scene from a point behind the scene at a particular elevation above the horizon rather than from directly above the scene. This is a preferred implementation. However, the pilot can switch perspectives for better perception of the horizontal or vertical positions of the traffic, respectively. In format 60, an aircraft symbol 62 sits on top an elevation post 64 which is proportional to the represented aircraft's relative altitude with respect to own aircraft represented by symbol 22. Elevation post 64 alternates between dashed and solid lines on a 500-foot basis, that is, a series of dashes represents 500 feet and a solid line represents 500 feet, and so on. The TCAS warning symbols, that is, filled-in square 30, filled-in circle 78, filled-in diamond 34 and open diamond 68, are located in reference plane 66 to indicate locations of represented aircraft, threat levels of aircraft, and threat azimuths of aircraft. The spoked reference plane 66 of FIG. 3 replaces the twelve symbols 36 in FIGS. 1 and 2, to enhance the perspective view and to increase the pilot's cognizance of his or her own altitude reference plane. The color codings, red, yellow and cyan, respectively, of filled-in square 30, filled-in circle and filled-in diamond, are like that of the standard TCAS format and present TCAS formats 10 and 40. Open diamond 68 represents no threat. Digital readout 14 indicates the relative altitude of the aircraft represented by symbol 62, with respect to own aircraft represented by symbol 22, in FIG. 3. Digital readout symbol 14 is placed just behind the right wing tip of symbol 62 representing the aircraft. Altitude vertical trend data of the aircraft is represented by the direction that filled triangles 70 is pointing, on the end of each of wing tip of symbol 62. No triangles on wing tips of aircraft symbol 72 indicate no vertical trend in altitude of represented aircraft. Format 60 may be decluttered by removing digital readout symbols 14 and 20 wherein the pilot relies wholly on the analog elevation post 64 height to determine relative altitude of the represented aircraft. Aircraft symbols 62 and 72 rotate to indicate horizontal trend in the same manner as aircraft symbols in the two-dimensional formats of FIGS. 1 and 2. A large aircraft symbol 74 (1.25 size) is red, extends from symbol 30 which is likewise red and represents resolution advisory traffic. A medium aircraft symbol 76 is yellow and extends from a solid yellow circle thereby representing a traffic alert with respect to the represented aircraft. A small aircraft symbol 23 would be cyan and extend from a cyan solid diamond thereby representing normal proximate traffic within 1200 feet of altitude to own aircraft 22.

The sizes of aircraft symbols 23, 62, 72 and 76, including other undesignated aircraft symbols, can be designated to indicate the level of threat of the respective represented aircraft on format 60 in FIG. 3. Another version is that sizes of the aircraft symbols represent closeness of the represented aircraft in terms of relative altitude, i.e., the closer the aircraft in altitude, the larger the symbol. The other version of aircraft symbols in format 60 may be implemented, in FIG. 3, wherein all aircraft symbols are of the same size and represent neither a level of threat discrimination nor nearness to own aircraft in terms of relative altitude.

Figure 4:
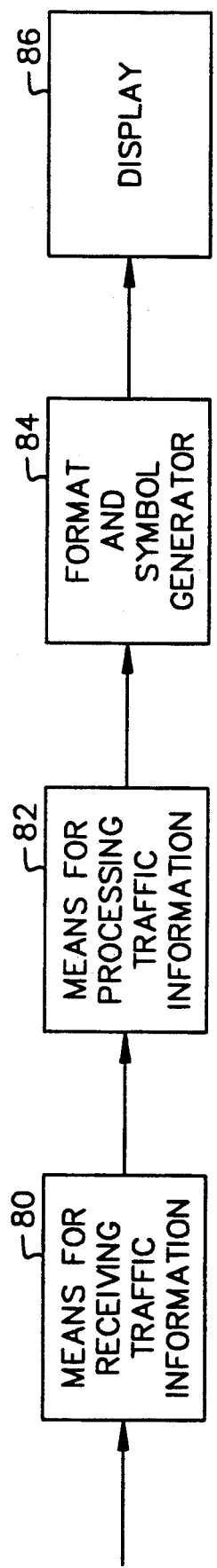
FIG. 4 is a block diagram of the processing and generation system for the perspective format.

Traffic information data are input to input interface 80 which passes the data in an appropriate data format to information processor 82 which processes the information for format and symbol generator 84 as shown in FIG. 4. The output of generator 84 goes to display 86 for presenting data to the observer in format 60.

Various sorts of processing devices may be utilized for generating the TCAS formats disclosed herein. In this particular embodiment, a Series 10000 personal supercomputer, from Apollo Computer Inc., of Chelmsford, Mass. 01824, is utilized with the ensuing programs listed below. The Apollo personal supercomputer may be used in actual operational use or as simulator for testing, or operational training. The TCAS format imagery from the computer may be displayed on a conventional CRT, color active matrix liquid crystal display or another kind of display device. The inputs of traffic information to the TCAS system may come from ground stations, own aircraft detection electronics, and/or other aircraft.

The following programs may be used to implement an above-described traffic information display format.

```
/*****************************************************************
 *                                                                *
 *   TCAS_PERS_AIRPLANE:  THIS FILE CONTAINS THE PROCEDURES REQUIRED FOR THE PERSPECITVE *
 *              VIEW TCAS FORMAT.  WHEN THIS FILE IS LINKED WITH "COMMON_TCAS.BIN"        *
 *              AN EXECUTABLE FILE IS CREATED.  THE FORMAT USES ROTATING AIRPLANES.       *
 *                                                                *
 *                                                                *
 *                                                                *
 *****************************************************************/ systype "sys5"
include <stdio.h>
#include <math.h>
#include "/sys/ins/base.ins.c";
#include "/sys/ins/error.ins.c";
#include "/sys/ins/gmr3d.ins.c";
#include "/sys/ins/vfmt.ins.c";

#define     PI             3.1415927
#define     red            8
#define     yellow         9
#define     cyan           10
#define     magenta        11
#define     white          12
#define     max_traffic    7
define     dual_window    0           /* 1 = inside/out + plan view         */ extern status_$t       st;             /* returns status of 3DGMR routines   */
extern short           declutter;      /* decluttering function              */ gmr_$structure_id_t    circle_id;      /* circle of unit radius              */
gmr_$structure_id_t    circles_id;     /* circles surrounding my airplane    */
gmr_$structure_id_t    spokes_id;      /* spokes on the circles              */
gmr_$structure_id_t    my_alt_id;      /* circle and spoke plateau           */
gmr_$structure_id_t    direction_id;   /* scaled direction shaft             */
gmr_$structure_id_t    up_direction_id; /* scaled direction indicator        */
gmr_$structure_id_t    down_direction_id; /* scaled direction indicator      */
gmr_$structure_id_t    jet_airplane_id; /* airplane symbol (Jet shape)       */
gmr_$structure_id_t    prox_ac_id;     /* prox airplane symbol               */
gmr_$structure_id_t    ta_ac_id;       /* traffic advisory symbol            */
gmr_$structure_id_t    ra_ac_id;       /* resolution advisory symbol         */
gmr_$structure_id_t    prox_id;        /* prox filled symbol                 */
```

```
gmr_$structure_id_t    ta_id;                      /* traffic advisory filled symbol    */
gmr_$structure_id_t    ra_id;                      /* resolution advisory filled symbol */
gmr_$structure_id_t    my_plane_id;                /* my scaled & rotated plane symbol  */
gmr_$structure_id_t    range_max_id;               /* 6 NM range ring                   */
gmr_$f3_vector_t       scale_airplane = ( 0.13333, 0.13333, 1.0 );
                                                   /* scaling vector for airplanes      */ typedef enum     ( xy, xz, yz ) planes_t;
planes_t               plane;                      /* the 3 planes symbols can lie in   */
typedef enum           ( prox, ta, ra ) threat_level_t;
typedef enum           ( up, down, none ) v_direction_t;
typedef struct {
    boolean            active;                     /* active status flag                */
    boolean            contender;                  /* denotes possible threat           */
    threat_level_t     threat_level;               /* threat of traffic - prox, ta, ra  */
    gmr_$f3_vector_t   position;                   /* 3d location of traffic symbol     */
    v_direction_t      v_direction;                /* vertical direction indicator      */
    boolean            alt_known;                  /* valid altitude data indicator     */
    float              az_dist;                    /* azimuth distance from my plane    */
    float              vx;                         /* constant x velocity of symbol     */
    float              vy;                         /* constant y velocity of symbol     */
    float              vz;                         /* constant z velocity of symbol     */
    float              lambda;                     /* time to closest approach          */
    float              r_closest;                  /* point of closest approach         */
    } traffic_t;
traffic_t              traffic[ max_traffic ];     /* traffic array of structures       */
gmr_$4x3_matrix_t      mat;                        /* matrix used for modeling          */
gmr_$f3_vector_t       plan_translate = ( 3.0, 0.0, 0.0 );
gmr_$f3_vector_t       scale1;                     /* scaling for circles & alt vector  */ short                  num_of_circs    = 3;
short                  num_of_spokes   = 12;
float                  inner_radius;

/******************************************************************************
 *                                                                            *
 *      CIRCLE                                                                *
 *                                                                            *
 *      PROCEDURE: GENERATES A CIRCLE OF A SPECIFIED NUMBER OF LINE SEGMENTS BY *
 *                TRAVELING AROUND THE UNIT CIRCLE.  THE MORE LINE SEGMENTS THE *
 *                CLOSER YOU GET TO A CIRCLE.  THE POLYGON LIES IN THE X-Y PLANE. *
 *                                                                            *
 *      PARAMS:    IN-> DETAIL = NUMBER OF LINE SEGMENTS TO GENERATE THE POLYGON *
 *                                                                            *
 ******************************************************************************/

: circle( detail )
#define    n_max   128
  int      detail;

int                      i, n;
  $f3_point_array_t        p;
  at                       theta, d_theta;

if (( detail > n_max ) || ( detail < 3 ))
        n = n_max;
    else
        n = detail;
    d_theta = (float)( 2.0 * PI / n );          /* complete revolution is 2*PI, so an nth */
                                                /* portion is 2*PI/n                      */
    for ( i = 0; i < n; i++ )
    {
        theta = (float)(i * d_theta);
        p[ i ].x = cos( theta );                /* x = cos(theta)*radius where radius = 1 */
        p[ i ].y = sin( theta );                /* y = sin(theta)*radius where radius = 1 */
        p[ i ].z = 0.0;
    }
    p[ n ] = p[ 0 ];
    gmr_$f3_polyline( (short)(n+1), p, false, st ); check( st );

/******************************************************************************
 *                                                                            *
 *      FILLED_SYMBOL                                                         *
 *                                                                            *
 *      PROCEDURE: GENERATES THE SCALED FILLED SYMBOL WITH POLYLINE FOR THREAT TYPES *
 *                                                                            *
 ******************************************************************************/
```

```
void filled_symbol(n)
short                       n;

{
gmr_Sf3_point_array_t       p;

if (n == 0)   /* finish up for RA */
    {
        p[0].x = .3*scale_airplane.x;
        p[0].y = .0*scale_airplane.y;
        p[0].z = .0;
        p[1].x = .3*scale_airplane.x;
        p[1].y = .5*scale_airplane.y;
        p[1].z = .0;
        p[2].x = -.3*scale_airplane.x;
        p[2].y = .5*scale_airplane.y;
        p[2].z = .0;
        p[3].x = -.3*scale_airplane.x;
        p[3].y = -.0*scale_airplane.y;
        p[3].z = .0;
        p[4] = p[0];
        gmr_Sf3_polygon( (short)5, p, st ); check( st );
    }
    if (n == 1)   /* finish up for TA */
    {
        p[0].x = .3*scale_airplane.x;
        p[0].y = .25*scale_airplane.y;
        p[0].z = .0;
        p[1].x = .26*scale_airplane.x;
        p[1].y = .4*scale_airplane.y;
        p[1].z = .0;
        p[2].x = .15*scale_airplane.x;
        p[2].y = .51*scale_airplane.y;
        p[2].z = .0;
        p[3].x = .0;
        p[3].y = .55*scale_airplane.y;
        p[3].z = .0;
        p[4].x = -.15*scale_airplane.x;
        p[4].y = .51*scale_airplane.y;
        p[4].z = .0;
        p[5].x = -.26*scale_airplane.x;
        p[5].y = .4*scale_airplane.y;
        p[5].z = .0;
        p[6].x = -.3*scale_airplane.x;
        p[6].y = .25*scale_airplane.y;
        p[6].z = .0;
        p[7].x = -.26*scale_airplane.x;
        p[7].y = .1*scale_airplane.y;
        p[7].z = .0;
        p[8].x = -.15*scale_airplane.x;
        p[8].y = -.01*scale_airplane.y;
        p[8].z = .0;
        p[9].x = .0;
        p[9].y = -.05*scale_airplane.y;
        p[9].z = .0;
        p[10].x = .15*scale_airplane.x;
        p[10].y = -.01*scale_airplane.y;
        p[10].z = .0;
        p[11].x = .26*scale_airplane.x;
        p[11].y = .1*scale_airplane.y;
        p[11].z = .0;
        p[12] = p[0];
        gmr_Sf3_polygon( (short)13, p, st ); check( st );
    }
    if (n == 2)   /* finish up for PROX */
    {
        p[0].x = .3*scale_airplane.x;
        p[0].y = .25*scale_airplane.y;
        p[1].z = .0;
        p[1].x = .0;
        p[1].y = .55*scale_airplane.y;
        p[1].z = .0;
        p[2].x = -.3*scale_airplane.x;
        p[2].y = .25*scale_airplane.y;
        p[2].z = .0;
        p[3].x = .0;
        p[3].y = -.05*scale_airplane.y;
        p[3].z = .0;
        p[4] = p[0];
        gmr_Sf3_polygon( (short)4, p, st ); check( st );
    }
}
```

```
/*******************************************************************************
*                                                                              *
*       AIRPLANE_SYMBOL                                                        *
*                                                                              *
*       PROCEDURE: GENERATES THE SCALED AIRPLANE SYMBOL WITH POLYLINE          *
*                                                                              *
*******************************************************************************/ void airplane_symbol(n)
short                       n;

{
gmr_Sf3_point_array_t       p;
float                       scale_airx,scale_airy;

if (n < 3)
   {
      p[0].x = -1*scale_airplane.x;
      p[0].y = .25*scale_airplane.y;
      p[0].z = .0;
      p[1].x = -1.*scale_airplane.x;
      p[1].y = -.25*scale_airplane.y;
      p[1].z = .0;
      p[2].x = -.125*scale_airplane.x;
      p[2].y = -.25*scale_airplane.y;
      p[2].z = .0;
      p[3].x = -.125*scale_airplane.x;
      p[3].y = -.75*scale_airplane.y;
      p[3].z = .0;
      p[4].x = -.5*scale_airplane.x;
      p[4].y = -.75*scale_airplane.y;
      p[4].z = .0;
      p[5].x = -.5*scale_airplane.x;
      p[5].y = -1.0*scale_airplane.y;
      p[5].z = .0;
      p[6].x = .5*scale_airplane.x;
      p[6].y = -1.0*scale_airplane.y;
      p[6].z = .0;
      p[7].x = .5*scale_airplane.x;
      p[7].y = -.75*scale_airplane.y;
      p[7].z = .0;
      p[8].x = .125*scale_airplane.x;
      p[8].y = -.75*scale_airplane.y;
      p[8].z = .0;
      p[9].x = .125*scale_airplane.x;
      p[9].y = -.25*scale_airplane.y;
      p[9].z = .0;
      p[10].x = 1.0*scale_airplane.x;
      p[10].y = -.25*scale_airplane.y;
      p[10].z = .0;
      p[11].x = 1.0*scale_airplane.x;
      p[11].y = .25*scale_airplane.y;
      p[11].z = 0 ;
      if (n == 0)  /* finish up for RA */
      {
          p[12].x = .3*scale_airplane.x;
          p[12].y = .25*scale_airplane.y;
          p[12].z = .0;
          p[13].x = .3*scale_airplane.x;
          p[13].y = .5*scale_airplane.y;
          p[13].z = .0;
          p[14].x = -.3*scale_airplane.x;
          p[14].y = .5*scale_airplane.y;
          p[14].z = .0;
          p[15].x = -.3*scale_airplane.x;
          p[15].y = .25*scale_airplane.y;
          p[15].z = .0;
          p[16] = p[0];
          gmr_Sf3_polyline( (short)16, p, true, st ); check( st );
      }
      if (n == 1)  /* finish up for TA */
      {
          p[12].x = .3*scale_airplane.x;
          p[12].y = .25*scale_airplane.y;
          p[12].z = .0;
          p[13].x = .21*scale_airplane.x;
          p[13].y = .46*scale_airplane.y;
          p[13].z = .0;
          p[14].x = .0;
          p[14].y = .55*scale_airplane.y;
          p[14].z = .0;
          p[15].x = -.21*scale_airplane.x;
          p[15].y = .46*scale_airplane.y;
```

```
            p[15].z = .0;
            p[16].x = -.3*scale_airplane.x;
            p[16].y = .25*scale_airplane.y;
            p[16].z = .0;
            p[17] = p[0];
            gmr_$f3_polyline( (short)17, p, true, st ); check( st );
        }
        if (n == 2)   /* finish up for PROX */
        {
            p[12].x = .3*scale_airplane.x;
            p[12].y = .25*scale_airplane.y;
            p[12].z = .0;
            p[13].x = .0;
            p[13].y = .55*scale_airplane.y;
            p[13].z = .0;
            p[14].x = -.3*scale_airplane.x;
            p[14].y = .25*scale_airplane.y;
            p[14].z = .0;
            p[15] = p[0];
            gmr_$f3_polyline( (short)15, p, true, st ); check( st );
        }
    }
    else
    {
        scale_airx = scale_airplane.x/194.;
        scale_airy = scale_airplane.y/194.;
        p[0].x = 0*scale_airx;
        p[0].y = 102*scale_airy;
        p[0].z = .0;
        p[1].x = 26*scale_airx;
        p[1].y = 78*scale_airy;
        p[1].z = .0;
        p[2].x = 26*scale_airx;
        p[2].y = 26*scale_airy;
        p[2].z = .0;
        p[3].x = 194*scale_airx;
        p[3].y = -24*scale_airy;
        p[3].z = .0;
        p[4].x = 194*scale_airx;
        p[4].y = -43*scale_airy;
        p[4].z = .0;
        p[5].x = 14*scale_airx;
        p[5].y = -19*scale_airy;
        p[5].z = .0;
        p[6].x = 5*scale_airx;
        p[6].y = -84*scale_airy;
        p[6].z = .0;
        p[7].x = 77*scale_airx;
        p[7].y = -114*scale_airy;
        p[7].z = .0;
        p[8].x = 78*scale_airx;
        p[8].y = -128*scale_airy;
        p[8].z = .0;
        p[9].x = 0*scale_airx;
        p[9].y = -111*scale_airy;
        p[9].z = .0;
        p[10].x = -78*scale_airx;
        p[10].y = -128*scale_airy;
        p[10].z = .0;
        p[11].x = -77*scale_airx;
        p[11].y = -114*scale_airy;
        p[11].z = 0 ;
        p[12].x = -5*scale_airx;
        p[12].y = -84*scale_airy;
        p[12].z = .0;
        p[13].x = -14*scale_airx;
        p[13].y = -19*scale_airy;
        p[13].z = .0;
        p[14].x = -194*scale_airx;
        p[14].y = -43*scale_airy;
        p[14].z = .0;
        p[15].x = -194*scale_airx;
        p[15].y = -24*scale_airy;
        p[15].z = .0;
        p[16].x = -26*scale_airx;
        p[16].y = 26*scale_airy;
        p[16].z = .0;
        p[17].x = -26*scale_airx;
        p[17].y = 78*scale_airy;
        p[17].z = .0;
        p[18] = p[0];
        gmr_$f3_polyline( (short)18, p, true, st ); check( st );
    }
}
```

```
/****************************************************************************
*                                                                           *
*       CIRCLES                                                             *
*                                                                           *
*       PROCEDURE: GENERATES CONCENTRIC CIRCLES IN THE X-Y PLANE WITH THE OUTER MOST *
*                 CIRCLE OF UNIT RADIUS.                                    *
*                                                                           *
*       PARAMS:   IN-> NUM_OF_CIRCS = NUMBER OF CONCENTRIC CIRCLES TO GENERATE *
*                                                                           *
****************************************************************************/ circles( num_of_circs )
short   num_of_circs;
{
#define     max_circs   10
short       i, n;
float       circ_spacing;

if (( num_of_circs > max_circs ) || ( num_of_circs < 1 ))
        n = max_circs;
    else
        n = num_of_circs;
    circ_spacing = (float)(1.0 / n);

/*** GET THE IDENTITY MATRIX TO USE AS A BASE MATRIX ***/
    gmr_$4x3_matrix_identity( mat, st ); check( st );

scale1.z = (float)1.0;
    for ( i = 1; i <= n; i++ )
    {
        scale1.x = (float)(i * circ_spacing);
        scale1.y = (float)(i * circ_spacing);
        gmr_$4x3_matrix_scale( gmr_$mat_replace, scale1, mat, st ); check( st );
        gmr_$instance_transform( circle_id, mat, st ); check( st );
    }
}

/****************************************************************************
*                                                                           *
*       SPOKES                                                              *
*                                                                           *
*       PROCEDURE: GENERATES A SERIES OF LINES RADIATING OUT FROM THE EDGES OF AN *
*                 INNER CIRCLE AND ENDING AT AN OUTER CIRCLE OF RADIUS ONE.  THE *
*                 BED OF SPOKES LIE IN THE X-Y PLANE.                       *
*                                                                           *
*       PARAMS:   IN-> NUM_OF_SPOKES = NUMBER OF SPOKES IN A 2PI SWEEP      *
*                 IN-> INNER_RADIUS  = RADIUS OF INNER CIRCLE               *
*                                                                           *
****************************************************************************/ spokes( num_of_spokes, inner_radius )
short   num_of_spokes;
float   inner_radius;

#define             max_spokes  12
short               i, n;
gmr_$f3_vector_t    p[2];
float               theta;
float               d_theta;

if (( num_of_spokes > max_spokes ) || ( num_of_spokes < 1 ))
        n = max_spokes;
    else
        n = num_of_spokes;
    d_theta = (float)(2.0 * PI / n);        /* complete revolution is 2*PI, so an nth */
                                            /* portion is 2*PI/n                      */
    p[ 0 ].z = 0.0;
    p[ 1 ].z = 0.0;
    for ( i = 1; i <= n; i++ )
    {
        theta = (float)( i * d_theta );
        p[ 0 ].x = cos( theta ) * inner_radius;/* beginning of spoke at inner_radius  */
        p[ 0 ].y = sin( theta ) * inner_radius;
        p[ 1 ].x = cos( theta );               /* end of spoke at radius = 1          */
        p[ 1 ].y = sin( theta );
        gmr_$f3_polyline( (short)2, p, false, st ); check( st );
    }
}
```

```
/********************************************************************************
*                                                                               *
*       MY_ALT_PLATEAU                                                          *
*                                                                               *
*       PROCEDURE: GENERATES MY ALTITUDE PLATEAU BY INSTANCING THE CONCENTRIC   *
*                  CIRCLES ON TOP OF THE SPOKES                                 *
*                                                                               *
********************************************************************************/ my_alt_plateau()
{
    /*** GET THE IDENTITY MATRIX TO USE AS A BASE MATRIX ***/
    gmr_$4x3_matrix_identity( mat, st ); check( st );
    gmr_$instance_transform( circles_id, mat, st ); check( st );
    gmr_$instance_transform( spokes_id, mat, st ); check( st );
}

/********************************************************************************
*                                                                               *
*       HORIZONTAL_TREND                                                        *
*                                                                               *
*       PROCEDURE:  RENDERS A HORIZONTAL TIME BASED TREND VECTOR AT THE BASE OF *
*                   A GIVEN PIECE OF TRAFFIC.                                   *
*                                                                               *
*       PARAMS:     INDEX = INDEX INTO TRAFFIC STRUCTURE ARRAY                  *
*                                                                               *
********************************************************************************/
    horizontal_trend( index )
    index;

$f3_vector_t    p[2];

if (declutter > 3)
    {
        gmr_$line_color( white, st );
        p[ 0 ].x = traffic[ index ].position.x + plan_translate.x;
        p[ 0 ].y = traffic[ index ].position.y + plan_translate.y;
        p[ 0 ].z = traffic[ index ].position.z + plan_translate.z;
        if (declutter==4)
        {
            p[ 1 ].x = p[ 0 ].x + traffic[ index ].vx * 5.0;
            p[ 1 ].y = p[ 0 ].y + traffic[ index ].vy * 5.0;
        }
        else
        {
            p[ 1 ].x = p[ 0 ].x - traffic[ index ].vx * 5.0;
            p[ 1 ].y = p[ 0 ].y - traffic[ index ].vy * 5.0;
        }
        p[ 1 ].z = p[ 0 ].z;
        gmr_$f3_polyline( (short)2, p, false, st );
    }

/********************************************************************************
*                                                                               *
*       DIRECTION                                                               *
*                                                                               *
*       PROCEDURE: GENERATES THE DIRECTION SYMBOL WHICH IS AN ARROW.            *
*                                                                               *
*       PARAMS:    SCALE =>    3D SCALING VECTOR                                *
*                                                                               *
********************************************************************************/
void    direction( scale )
gmr_$f3_vector_t    scale;
{
gmr_$f3_vector_t    p[ 5 ], str_pos;
    p[ 0 ].x =  0 * scale.x;
    p[ 0 ].y =  0.0 * scale.y;
    p[ 0 ].z =  1.0 * scale.z;
            str_pos.x = 0.;
            str_pos.y = 0.;
            str_pos.z = 0.;
            gmr_$text( "", (short)1, str_pos, st ); check( st );
    p[ 1 ].x =  0. * scale.x;
    p[ 1 ].y = -0.5 * scale.y;
    p[ 1 ].z =  0. * scale.z;
    p[ 2 ].x =  0.* scale.x;
    p[ 2 ].y =  0.5 * scale.y;
```

```
    p[ 2 ].z =  0. * scale.z;
    p[ 3 ] = p [ 0 ];
    gmr_$f3_polygon( (short)4, p, st ); check( st );
}

/*****************************************************************************
*                                                                            *
*       SORT_TRAFFIC                                                         *
*                                                                            *
*       PROCEDURE:  SORTS THE TRAFFIC ARRAY SO THAT THE TRAFFIC SYMBOLOGY WILL BE *
*                   RENDERED IN THE PROPER ORDER TO INSURE CORRECT MASKING.  PROPER *
*                   MASKING REQUIRES A SORT ON THE MAGNITUDE OF Z.  TRAFFIC SHOULD *
*                   BE RENDERED FROM MOST NEGATIVE Z TO MOST POSITIVE Z.     *
*                                                                            *
*****************************************************************************/
void    sort_traffic()
{
short               index, outer_loop;
traffic_t           temp;
auto    boolean     not_done = true;

for ( index = 0; index < max_traffic; index++ )
        if ( !traffic[ index ].alt_known )
        {
            traffic[ index ].position.z = 0.0;
            traffic[ index ].v_direction = none;
        } for ( outer_loop = 1; ((outer_loop < max_traffic) && (not_done)); outer_loop++ )
    {
        not_done = false;
        for ( index = 1; index < max_traffic; index++ )
        {
            if ( traffic[ index ].position.z < traffic[ (short)(index-1) ].position.z )
            {
                temp = traffic[ (short)(index-1) ];
                traffic[ (short)(index-1) ] = traffic[ index ];
                traffic[ index ] = temp;
                not_done = true;
            }
        }
    }
}

/*****************************************************************************
*                                                                            *
*       TRAFFIC_SYMBOL                                                       *
*                                                                            *
*       PROCEDURE:  INSTANCES THE TRAFFIC SYMBOLS AT THE APPROPRIATE LOCATIONS *
*                   AND THEN RENDERS THE NUMERIC DATA TAGS.  RENDERING COLOR IS *
*                   ALSO CHOSEN AT THIS TIME BASED UPON LEVEL OF THREAT.     *
*                                                                            *
*       PARAMS:     INDEX => INDEX INTO THE TRAFFIC STRUCTURE ARRAY.         *
*                                                                            *
*****************************************************************************/
void    traffic_symbol( index )
short   index;
{
static  gmr_$f3_vector_t    neg_arrow_trans = {  0.09, 0.06, 0.0 };
static  gmr_$f3_vector_t    pos_arrow_trans = { -0.09, 0.06, 0.0 };
gmr_$structure_id_t         airplane_id;           /*    airplane symbol        */
gmr_$structure_id_t         filled_id;             /*    airplane filled symbol */
vfmt_$string_t              alt_str;
float                       distance, f_theta, text_scale, fill_tran_x, z_val;
double                      ang, x_val, y_val, theta;
short                       length, altitude, i, line_type, z_count;
gmr_$f3_point_t             str_pos;
gmr_$f3_vector_t            t_scale, t_translate, p[10];

t_scale.x = .8;
    calc_threat( index );
    if ( traffic[ index ].threat_level == ra )
    {
        gmr_$fill_color( red, st ); check( st );
        gmr_$line_color( red, st ); check( st );
        gmr_$text_color( red, st ); check( st );
        if ((declutter == 0) || (declutter == 3)) t_scale.x = 1.25;
        filled_id = ra_id;
    }
```

```
        else
            if ( traffic[ index ].threat_level == ta )
            {
                gmr_$fill_color( yellow, st ); check( st );
                gmr_$line_color( yellow, st ); check( st );
                gmr_$text_color( yellow, st ); check( st );
                if ((declutter == 0) || (declutter == 3)) t_scale.x = 1.0;
                filled_id = ta_id;
            }
            else
            {
                gmr_$fill_color( cyan, st ); check( st );
                gmr_$line_color( cyan, st ); check( st );
                gmr_$text_color( cyan, st ); check( st );
                filled_id = prox_id;
            }
    airplane_id = jet_airplane_id;
    t_translate.x = 0;
    t_translate.y = -.25*scale_airplane.y*t_scale.x;
    t_translate.z = 0;
    t_scale.y = t_scale.x;
    t_scale.z = 1.0;
    text_scale = .065*t_scale.x;

gmr_$text_height( text_scale, st ); check( st );

x_val = traffic[index].vx;
    y_val = traffic[index].vy;
    theta =  atan2(y_val,x_val);
    f_theta = PI*1.5 + theta;
    gmr_$4x3_matrix_scale(gmr_$mat_replace,t_scale,mat,st);check(st);
    gmr_$4x3_matrix_rotate(gmr_$mat_post_mult,gmr_$z_axis,f_theta,mat,st);check(st);
    gmr_$4x3_matrix_translate( gmr_$mat_post_mult, traffic[ index ].position, mat , st );
    check( st );
    gmr_$4x3_matrix_translate( gmr_$mat_post_mult, plan_translate, mat , st );
    gmr_$instance_transform( airplane_id, mat, st ); check( st );

t_translate.x += traffic[index].position.x;
    t_translate.y += traffic[index].position.y;
    gmr_$4x3_matrix_scale(gmr_$mat_replace,t_scale,mat,st);check(st);
    gmr_$4x3_matrix_translate( gmr_$mat_post_mult, t_translate, mat , st );
    gmr_$4x3_matrix_translate( gmr_$mat_post_mult, plan_translate, mat , st );
    if ( traffic[ index ].alt_known )
    {
        if ((traffic[ index ].position.z < 0.3) && (traffic[ index ].position.z > -0.3))
            gmr_$fill_style( gmr_$fill_solid, st );
        else gmr_$fill_style( gmr_$fill_hollow, st );
        check( st );
        gmr_$instance_transform( filled_id, mat, st ); check( st );
        gmr_$fill_style( gmr_$fill_solid, st );
        if ((declutter == 1)||(declutter == 2)) gmr_$line_color( white, st ); check( st );
        p[0].x = traffic[index].position.x + plan_translate.x;
        p[0].y = traffic[index].position.y + plan_translate.y;
        p[0].z = 0;
        z_val = traffic[index].position.z;
        line_type = 3;
        z_count = z_val*256.0;
        if (z_count < 0)
        {
            z_count = -z_count;
            line_type = 1;
        }
        z_count = (z_count >> 5) + 1;
        for (i=1; i < z_count; i++)
        {
            p[i] = p[0];
            p[i].z = i*.125;
            if (z_val < 0) p[i].z = -p[i].z;
        }
        p[z_count] = p[0];
        p[z_count].z = z_val;
        i = (z_count+1)>>1;
        i = i+i;
        gmr_$line_type(line_type,st); check(st);
        gmr_$f3_multiline( i, p, st ); check( st );
        for (i=0; i<z_count; i++) p[i] = p[i+1];
        i = z_count>>1;
        i = i+i;
        line_type = 4-line_type;
        gmr_$line_type(line_type,st); check(st);
        if (z_count > 1) gmr_$f3_multiline( i, p, st ); check( st );
        gmr_$line_type((short)1,st); check(st);
```

```
if (declutter > 1)
{
if ((declutter == 3) || !( traffic[ index ].threat_level == prox ))
{
    theta = theta + PI*1.2;
    t_translate.x = traffic[index].position.x + .19*cos(theta)*t_scale.x + plan_translate.x;
    t_translate.y = traffic[index].position.y + .19*sin(theta)*t_scale.x + plan_translate.y;
    t_translate.z = traffic[index].position.z;
    altitude = (short)(traffic[ index ].position.z * 40);
    vfmt_$encode2( "%3ZPWD%$", alt_str, (short)80, length, altitude, 0 );
    t_translate.x = t_translate.x + text_scale*.5;
    t_translate.y = t_translate.y - text_scale*1.0;
    gmr_$text( alt_str, length, t_translate, st ); check( st );
/*     t_translate.y = t_translate.y + text_scale*2.5;
    t_translate.z += .04*t_scale.x;
    gmr_$4x3_matrix_scale(gmr_$mat_replace,t_scale,mat,st);check(st);
    gmr_$4x3_matrix_translate( gmr_$mat_post_mult, t_translate, mat , st ); check( st );

switch( traffic[ index ].v_direction )
    {
        case( up )   : gmr_$instance_transform( up_direction_id, mat, st ); check( st );
                       gmr_$instance_transform( direction_id, mat, st ); check( st );
                 break;
        case( down ) : gmr_$instance_transform( down_direction_id, mat, st ); check( st );
                       gmr_$instance_transform( direction_id, mat, st ); check( st );
                 break;
    }
*/
    theta = theta - PI*1.2;
}
}
if (!(declutter == 2))
{
    if (declutter == 0) gmr_$fill_style( gmr_$fill_hollow, st ); */
    theta = theta + PI*1.45;
    t_translate.x = traffic[index].position.x + .13*cos(theta)*t_scale.x + plan_translate.x;
    t_translate.y = traffic[index].position.y + .13*sin(theta)*t_scale.x + plan_translate.y;
    t_translate.z = traffic[index].position.z;
    gmr_$4x3_matrix_scale(gmr_$mat_replace,t_scale,mat,st);check(st);
    gmr_$4x3_matrix_translate( gmr_$mat_post_mult, t_translate, mat , st ); check( st );

switch( traffic[ index ].v_direction )
    {
        case( up )   : gmr_$instance_transform( up_direction_id, mat, st ); check( st );
                 break;
        case( down ) : gmr_$instance_transform( down_direction_id, mat, st ); check( st );
                 break;
    }
    theta = theta - PI*0.9;
    t_translate.x = traffic[index].position.x + .13*cos(theta)*t_scale.x + plan_translate.x;
    t_translate.y = traffic[index].position.y + .13*sin(theta)*t_scale.x + plan_translate.y;
    t_translate.z = traffic[index].position.z;
    gmr_$4x3_matrix_scale(gmr_$mat_replace,t_scale,mat,st);check(st);
    gmr_$4x3_matrix_translate( gmr_$mat_post_mult, t_translate, mat , st ); check( st );

switch( traffic[ index ].v_direction )
    {
        case( up )   : gmr_$instance_transform( up_direction_id, mat, st ); check( st );
                 break;
        case( down ) : gmr_$instance_transform( down_direction_id, mat, st ); check( st );
                 break;
    }
    gmr_$fill_style( gmr_$fill_solid, st );
}
if (declutter == 2)
{
    gmr_$fill_color( white, st ); check( st );
    gmr_$line_color( white, st ); check( st );
    t_translate.x = traffic[index].position.x + plan_translate.x;
    t_translate.y = traffic[index].position.y + plan_translate.y;
    t_translate.z = traffic[index].position.z;
    if ((t_translate.z > 0) && (traffic[index].v_direction == down))
        t_translate.z += .04*t_scale.x;
    if ((t_translate.z < 0) && (traffic[index].v_direction == up))
        t_translate.z += -.04*t_scale.x;
    gmr_$4x3_matrix_scale(gmr_$mat_replace,t_scale,mat,st);check(st);
    gmr_$4x3_matrix_translate( gmr_$mat_post_mult, t_translate, mat , st ); check( st );

switch( traffic[ index ].v_direction )
    {
        case( up )   : gmr_$instance_transform( up_direction_id, mat, st ); check( st );
                 break;
        case( down ) : gmr_$instance_transform( down_direction_id, mat, st ); check( st );
                 break;
    }
}
}
}
```

```
/*******************************************************************************
 *                                                                             *
 *      CREATE_SCENE                                                           *
 *                                                                             *
 *      PROCEDURE: GENERATES A COMPOSITE SCENE BY RENDERING ONLY THOSE TRAFFIC *
 *                 SYMBOLS THAT RESIDE WITHIN THE DESIGNATED VIEWING VOLUME.   *
 *                                                                             *
 *******************************************************************************/
void    create_scene()
{
static  gmr_$text_height_t   text_scale    = 0.05;
auto    boolean              not_drawn     = true;
short                        index;

gmr_$fill_style( gmr_$fill_solid, st ); check( st );
    gmr_$fill_inten( (float)1.0, st ); check( st );
    gmr_$line_inten( (float)1.0, st ); check( st );
    for ( index = 0; index < max_traffic; index++ )
    {
        if ( (traffic[ index ].az_dist < 1.0) &&
             (traffic[ index ].position.z < 0.75) &&
             (traffic[ index ].position.z > -0.375) )
        {
            if ( ( traffic[ index ].position.z >= 0.0 ) && ( not_drawn ) )
            {
                gmr_$fill_color( white, st ); check( st );
                gmr_$line_color( white, st ); check( st );
                gmr_$4x3_matrix_identity( mat, st ); check( st );
                gmr_$4x3_matrix_translate( gmr_$mat_post_mult, plan_translate, mat , st );
                gmr_$instance_transform( my_plane_id, mat, st ); check( st );
                gmr_$fill_inten( (float)0.6, st ); check( st );
                gmr_$line_inten( (float)0.6, st ); check( st );
                gmr_$fill_style( gmr_$fill_hollow, st ); check( st );
                gmr_$instance_transform( my_alt_id, mat, st ); check( st );
                gmr_$fill_style( gmr_$fill_solid, st ); check( st );
                not_drawn = false;
                gmr_$line_inten( (float)1.0, st ); check( st );
                gmr_$fill_inten( (float)1.0, st ); check( st );
            }
            traffic_symbol( index );
            horizontal_trend( index );
        }
    }
    if ( not_drawn )
    {
        gmr_$fill_color( white, st ); check( st );
        gmr_$line_color( white, st ); check( st );
        gmr_$4x3_matrix_identity( mat, st ); check( st );
        gmr_$4x3_matrix_translate( gmr_$mat_post_mult, plan_translate, mat , st );
        gmr_$instance_transform( my_plane_id, mat, st ); check( st );
        gmr_$fill_inten( (float)0.6, st ); check( st );
        gmr_$line_inten( (float)0.6, st ); check( st );
        gmr_$fill_style( gmr_$fill_hollow, st ); check( st );
        gmr_$instance_transform( my_alt_id, mat, st ); check( st );
    }
}

/*******************************************************************************
 *                                                                             *
 *      VIEWING_PARAMS                                                         *
 *                                                                             *
 *      PROCEDURE:  GIVEN A VIEWPORT_ID, SETUP VIEWING PARAMETERS THAT         *
 *                  DEFINE HOW WE LOOK AT THE WORLD.                           *
 *                                                                             *
 *      PARAMS:     VPID => VIEWPORT ID FOR VEIWING PARAMETERS.                *
 *                                                                             *
 *******************************************************************************/
void    viewing_params( vpid )
gmr_$viewport_id_t     vpid;
{
static  gmr_$f3_point_t      ref_point     = { 4.0+3.0, 0.0, 2.5 };
static  gmr_$f3_vector_t     normal        = { 4.0, 0.0, 2.5 };
static  gmr_$f3_vector_t     up_vec        = { -1.0, 0.0, 0.0 };
static  gmr_$f2_limits_t     window        = {-1.0, 1.0, -1.0, 1.0 };
static  gmr_$f_t             h_dist        = -0.1;
static  gmr_$f_t             v_dist        = -4.0;
static  gmr_$f_t             y_dist        = -15.0;
static  gmr_$projection_t    proj          = gmr_$perspective;
static  gmr_$coord_system_t  coord_sys     = gmr_$coord_right;
static  gmr_$border_width_t  obj_border    = { 1, 1, 1, 1 };

gmr_$view_set_reference_point( vpid, ref_point, st ); check( st );
    gmr_$view_set_view_plane_normal( vpid, normal, st ); check( st );
    gmr_$view_set_up_vector( vpid, up_vec, st ); check( st );
    gmr_$view_set_view_distance( vpid, v_dist, st ); check( st );
```

```
    gmr_$view_set_hither_distance( vpid, h_dist, st ); check( st );
    gmr_$view_set_yon_distance( vpid, y_dist, st ); check( st );
    gmr_$view_set_window( vpid, window, st ); check( st );
    gmr_$view_set_projection_type( vpid, proj, st ); check( st );
    gmr_$view_set_coord_system( vpid, coord_sys, st ); check( st );
    gmr_$viewport_set_shading_mode( vpid, gmr_$shading_attrib, gmr_$render_filled,
                                    gmr_$hs_no_hidden_surface, st ); check( st );
}

/*****************************************************************************
 *                                                                           *
 *      CREATE_SYMBOLS                                                       *
 *                                                                           *
 *      PROCEDURE: CREATE TRAFFIC SYMBOL STRUCTURES TO BE USED LATER.        *
 *                                                                           *
 *****************************************************************************/
    create_symbols()

static  gmr_$f3_vector_t    scale_ast           = { 0.025, 0.025, 0.025 };
static  gmr_$f3_vector_t    down_scale_direction = { 0.04, 0.04, -0.04 };
static  gmr_$f3_vector_t    up_scale_direction   = { 0.04, 0.04, 0.04 };
static  gmr_$f3_vector_t    scale_plane         = { 0.05, 0.05, 0.05 };
static  gmr_$f3_vector_t    scale_me            = { 0.05, 0.06, 0.06 };
   $f3_vector_t    p[ 3 ];

/*** CREATE A CIRCLE OF UNIT RADIUS IN THE X-Y PLANE ***/
gmr_$structure_create( "", 0, circle_id, st ); check( st );
circle( 40 );
gmr_$structure_close( true, st ); check( st );

/*** CREATE CONCENTRIC CIRCLES IN THE X-Y PLANE WITH THE OUTER MOST CIRCLE OF UNIT RADIUS ***/
gmr_$structure_create( "", 0, circles_id, st ); check( st );
circles( num_of_circs );
gmr_$structure_close( true, st ); check( st );

/*** CREATE SPOKES OF UNIT LENGTH LYING IN THE X-Y PLANE RADIATING OUT FROM THE ORIGIN ***/
gmr_$structure_create( "", 0, spokes_id, st ); check( st );
inner_radius = (float)( 1.0 / num_of_circs );
spokes( num_of_spokes, inner_radius );
gmr_$structure_close( true, st ); check( st );

/*** CREATE MY ALTITUDE PLATEAU BY INSTANCING THE SPOKES ON THE CIRCLES ***/
gmr_$structure_create( "", 0, my_alt_id, st ); check( st );
my_alt_plateau();
gmr_$structure_close( true, st ); check( st );

/*** CREATE THE DIRECTION SYMBOL IN THE X-Y PLANE ***/
gmr_$structure_create( "", 0, down_direction_id, st ); check( st );
direction( down_scale_direction );
gmr_$structure_close( true, st ); check( st );

/*** CREATE THE DIRECTION SYMBOL IN THE X-Y PLANE ***/
gmr_$structure_create( "", 0, up_direction_id, st ); check( st );
direction( up_scale_direction );
gmr_$structure_close( true, st ); check( st );

/*** CREATE THE DIRECTION ARROW SHAFT IN THE X-Y PLANE ***/
gmr_$structure_create( "", 0, direction_id, st ); check( st );
p[ 0 ].x = 0;
p[ 0 ].y = 0.0;
p[ 0 ].z = up_scale_direction.z;
p[ 1 ].x = 0;
p[ 1 ].y = 0.0;
p[ 1 ].z = -up_scale_direction.z;
gmr_$f3_polyline( (short)2, p, false, st ); check( st );
gmr_$structure_close( true, st ); check( st );

/*** CREATE THE SCALED AIRPLANE SYMBOL FOR RA ***/
gmr_$structure_create( "", 0, ra_ac_id, st ); check( st );
airplane_symbol((short)0);
gmr_$structure_close( true, st ); check( st );

/*** CREATE THE SCALED AIRPLANE SYMBOL FOR TA ***/
gmr_$structure_create( "", 0, ta_ac_id, st ); check( st );
airplane_symbol((short)1);
gmr_$structure_close( true, st ); check( st );

/*** CREATE THE SCALED AIRPLANE SYMBOL FOR PROX ***/
gmr_$structure_create( "", 0, prox_ac_id, st ); check( st );
airplane_symbol((short)2);
gmr_$structure_close( true, st ); check( st );

/*** CREATE THE SCALED JET AIRPLANE SYMBOL ***/
gmr_$structure_create( "", 0, jet_airplane_id, st ); check( st );
airplane_symbol((short)3);
gmr_$structure_close( true, st ); check( st );
```

```
/*** CREATE THE SCALED FILLED SYMBOL FOR RA ***/
gmr_$structure_create( "", 0, ra_id, st ); check( st );
filled_symbol((short)0);
gmr_$structure_close( true, st ); check( st );

/*** CREATE THE SCALED FILLED SYMBOL FOR TA ***/
gmr_$structure_create( "", 0, ta_id, st ); check( st );
filled_symbol((short)1);
gmr_$structure_close( true, st ); check( st );

/*** CREATE THE SCALED FILLED SYMBOL FOR PROX ***/
```

I claim:

1. A traffic information display format system for observing traffic in a volume about an own craft, comprising:
   a display having a viewing surface and presenting to an observer a disk symbol and at least one traffic symbol, wherein: said disk symbol comprises:
   a center symbol representing the own craft;
   a plurality of rings concentric to the center symbol, representing increments of range from the own craft;
   and a plurality of spokes extending outward from the center symbol and intersecting the plurality of rings, representing increments of azimuth about the own craft;
   said disk symbol is in a geometric plane representing the altitude of the own craft;
   said disk symbol is presented on said display, so as to appear to the observer at a multidimensional perspective viewing angle between zero and ninety degrees;
   said traffic symbol representing a traffic entity, is situated in the same perspective viewing angle as said disk symbol, has a shape resembling the traffic entity, the shape indicating the direction of movement of the traffic entity parallel to the plane, has an altitude symbol connected to said traffic symbol for indicating a direction of altitude change of the traffic entity, has a scaled altitude line connected from said traffic symbol to said disk symbol for indicating altitude of the traffic entity relative to the own craft, the line length variable with altitude difference between the traffic entity and own craft, and has a position symbol on said disk symbol at the scaled altitude line for indicating range and azimuth of the traffic entity relative to the own craft;
   and said traffic symbol has a triple-redundant coding for indicating a level of a threat warning to the own craft, said traffic symbol having a size that is variable such that the size indicates and is proportional to the level of threat warning, and the position symbol having a shape and a color that change such that the shape of the position symbol indicates the level of the threat warning and the color of the position symbol likewise indicates the level of the threat warning;
   and said traffic symbol has an numeric symbol proximate to said traffic symbol for redundant indication of altitude of the traffic entity relative to the own craft.

2. Display format system of claim 1 further comprising:
   means for receiving traffic information;
   means for processing traffic information, connected to said means for receiving traffic information; and
   means for generating said disk symbol and said traffic symbol, connected to said means for processing traffic information and connected to said display.

3. A traffic information display format system for observing traffic in a volume about an own craft, comprising:
   a display having a viewing surface and presenting to an observer a disk symbol and at least one traffic symbol, wherein:
   said disk symbol comprises: a center symbol representing the own craft;
   a plurality of rings concentric to the center symbol, representing increments of range from the own craft;
   said disk symbol is presented on said display, so as to appear to the observer at a multi-dimensional perspective viewing angle between zero and ninety degrees;
   said traffic symbol represents a traffic entity;
   wherein said traffic symbol is situated in the same perspective viewing angle as said disk symbol, has a shape representing the traffic entity, the shape indicating the direction of movement of the traffic entity parallel to the plane, has an altitude symbol connected to said traffic symbol for indicating a direction of altitude change of the traffic entity, has a scaled altitude line connected from said traffic symbol to said disk symbol for indicating altitude of the traffic entity relative to the own craft, the line length variable with altitude difference between the traffic entity and own craft, and has a position symbol on said disk symbol at the scaled altitude line for indicating range and azimuth of the traffic entity relative to the own craft;
   and said traffic symbol has a size that is variable such that the size indicates and is proportional to the level of threat warning, and the position symbol has a shape and a color that change such that the shape of the position symbol indicates the level of the threat warning and the color of the position symbol likewise indicates the level of the threat warning;
   and said traffic symbol has an numeric symbol proximate to said traffic symbol for redundant indication of altitude of the traffic entity relative to the own craft.

4. Display format system of claim 3, wherein:
   said traffic symbol has a triple-redundant coding for indicating a level of a threat warning to the own craft; and
   said disk symbol is in a geometric plane representing altitude of the own craft.

* * * * *